United States Patent
Wolf et al.

(10) Patent No.: US 12,176,556 B2
(45) Date of Patent: Dec. 24, 2024

(54) MODULE ELEMENT FOR A BATTERY MODULE, AND BATTERY MODULE

(71) Applicant: KAUTEX TEXTRON GmbH & Co. KG, Bonn (DE)

(72) Inventors: Hartmut Wolf, Konigswinter (DE); Weiwei Zhao, Bonn (DE); Holger Fielon, Leichlingen (DE)

(73) Assignee: KAUTEX TEXTRON Gmbh & Co. KG, Bonn (DE)

( * ) Notice: Subject to any disclaimer, the term of this patent is extended or adjusted under 35 U.S.C. 154(b) by 891 days.

(21) Appl. No.: 17/289,693

(22) PCT Filed: Oct. 30, 2019

(86) PCT No.: PCT/EP2019/079675
§ 371 (c)(1),
(2) Date: Apr. 28, 2021

(87) PCT Pub. No.: WO2020/089298
PCT Pub. Date: May 7, 2020

(65) Prior Publication Data
US 2021/0408630 A1 Dec. 30, 2021

(30) Foreign Application Priority Data
Oct. 31, 2018 (DE) .......................... 102018127308.8

(51) Int. Cl.
| | | |
|---|---|---|
| *H01M 50/207* | (2021.01) | |
| *H01M 10/04* | (2006.01) | |
| *H01M 50/204* | (2021.01) | |
| *H01M 50/227* | (2021.01) | |
| *H01M 50/231* | (2021.01) | |

(52) U.S. Cl.
CPC ..... *H01M 50/207* (2021.01); *H01M 10/0481* (2013.01); *H01M 50/204* (2021.01); *H01M 50/227* (2021.01); *H01M 50/231* (2021.01)

(58) Field of Classification Search
None
See application file for complete search history.

(56) References Cited

U.S. PATENT DOCUMENTS

| | | |
|---|---|---|
| 2014/0038029 A1 | 2/2014 | Markus et al. |
| 2014/0190445 A1* | 7/2014 | Reese ................... F02F 7/0073 29/527.1 |

FOREIGN PATENT DOCUMENTS

| | | |
|---|---|---|
| CN | 103370811 | 10/2013 |
| CN | 103764984 | 4/2014 |
| CN | 104253252 | 12/2014 |

(Continued)

OTHER PUBLICATIONS

Machine Translation of CN 107437599 (Year: 2017).*

(Continued)

*Primary Examiner* — Wyatt P McConnell
(74) *Attorney, Agent, or Firm* — Lee & Hayes, P.C.

(57) ABSTRACT

A plate element for a battery module for receiving battery cells of the battery module includes a first plate element part and a second plate element part. The first plate element part is connected to the second plate element part. The first plate element part includes a first base body and a first organosheet arranged on the first base body. The second plate element part includes a second base body and a second organosheet arranged on the second base body.

12 Claims, 4 Drawing Sheets

(56) References Cited

FOREIGN PATENT DOCUMENTS

Figure 1:
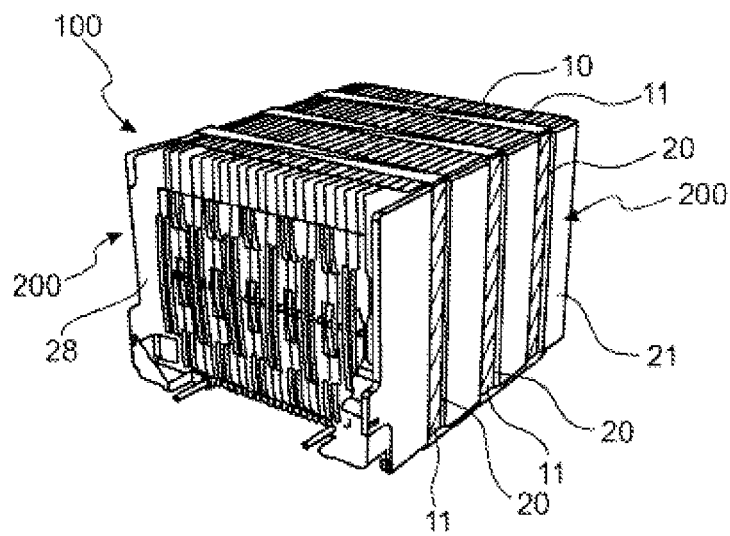

| | | |
|---|---|---|
| CN | 107437599 | 12/2017 |
| CN | 107946488 | 4/2018 |
| DE | 102011111744 | 2/2013 |
| DE | 102013004931 | 9/2014 |
| DE | 102013210585 | 12/2014 |
| DE | 102015208999 | 11/2016 |
| DE | 102017000263 | 7/2017 |
| EP | 2819210 | 12/2014 |
| WO | WO0128845 | 4/2001 |

OTHER PUBLICATIONS

Chinese Office Action mailed Aug. 24, 2022, for Chinese Patent Application 201980071275.5, a foreign counterpart to U.S. Appl. No. 17/289,693, 22 pages, including translation.

PCT Search Report for corresponding PCT Application No. PCT/EP2019/079675 dated Mar. 23, 2020, 25 pages.

PCT International Preliminary Report on Patentability for corresponding PCT International Application No. PCT/EP2019/079675 dated May 14, 2021, 12 pages.

\* cited by examiner

MODULE ELEMENT FOR A BATTERY MODULE, AND BATTERY MODULE

This Application claims priority to PCT Application No. PCT/EP2019/079675, filed Oct. 30, 2019, which claims priority to German Patent Application Serial No. 102018127308.8, filed Oct. 31, 2018, the contents of each of which is incorporated herein by reference.

The invention relates to a plate element for a battery module for receiving battery cells of the battery module. The invention also relates to a battery module for arrangement in a battery housing.

To position a plurality of battery cells arranged in a pack, also called pouch cells, in a battery module, the battery cells can be arranged between oppositely arranged plate elements of the battery module, also called end plates, by accommodating the battery cells between the two plate elements. In that case, such a battery module can be arranged in a battery housing of a battery, for example a battery for driving a hybrid vehicle or for driving a fully electric vehicle. One of the tasks of the plate elements is to position and hold a battery module and thus the battery cells of a battery module in the desired position in the battery housing. The plate elements can accommodate dynamic load conditions.

It is currently known to form the plate elements from an aluminum element which is formed in one piece. Such plate elements are, however, very heavy, and consequently the battery module and therefore the entire battery are very heavy as well. In addition, a plate element made of an aluminum element is expensive, and its manufacturing is complex.

The object of the invention is therefore to provide a plate element as well as a battery module which are distinguished by a reduced weight but high stability.

This object is achieved according to the invention by the features of the independent claims. Expedient embodiments and advantageous developments of the invention are specified in the dependent claims.

The plate element according to the invention is thus characterized in that it comprises a first plate element part and a second plate element part, wherein the first plate element part is connected to the second plate element part, wherein the first plate element part comprises a first base body and a first organosheet arranged on the first base body, and wherein the second plate element part comprises a second base body and a second organosheet arranged on the second base body.

The plate element according to the invention is no longer made in one piece, but rather has a sandwich structure in which a plurality of layers of material are stacked on top of one another. The plate element is formed from two plate element parts which are produced separately from one another and are only connected to one another after the production of the two plate element parts in order to form the plate element. In the connected state, the plate element parts are preferably in contact with one another with their longitudinal side surfaces. The two plate element parts each have a base body and an organosheet arranged on the base body. The organosheets each have a fibrous fabric or fibrous scrim, which is embedded in a thermoplastic plastic matrix. Organosheets are characterized by a particularly low weight but also by high strength and rigidity at the same time. The organosheet preferably comprises carbon fibers, which are embedded in a thermoplastic plastic matrix. The thermoplastic plastic matrix of the organosheet can, for example, be made from polyamide, in particular from polyamide 6. By using organosheets, the plate element parts and thus the plate element can be provided with a particularly good bending resistance without the plate element having to be made from a metal material. In addition to the high strength and rigidity, it can be achieved that the weight of the plate element can be reduced significantly compared to conventional plate elements made of metal materials. The organosheet preferably rests flat on the base body.

The first plate element part and the second plate element part are connected to one another in such a way that the first organosheet forms at least a portion of a first outer surface of the plate element, and the second organosheet forms at least a portion of a second outer surface of the plate element that is opposite the first outer surface. The organosheets are therefore preferably each arranged on the outside of the plate element such that the organosheets can have a particularly good stabilizing effect on the plate element. Due to the arrangement of the organosheets on the outside, a particularly good flexural strength of the plate element can be achieved. In the connected state, the base bodies of the two plate element parts then preferably lie flat against one another.

In order to be able to further reduce the weight of the plate element and also further improve the processability and manufacturability of the plate element, the first base body and/or the second base body can be made of a thermoplastic plastics material. The thermoplastic plastics material can be, for example, a polyamide, in particular a polyamide 6. The first base body and the second base body are preferably made of a thermoplastic plastics material. In that case, the first base body and the second base body are particularly preferably formed from the same thermoplastic plastics material, as a result of which a particularly good connection can be formed between the two plate element parts via the two base bodies. As a result of being made from a thermoplastic plastics material, the first base body and/or the second base body can be produced in an injection molding process and thus be an injection-molded part.

The thermoplastic plastics material of the first base body and/or the thermoplastic plastics material of the second base body can comprise a fiber reinforcement. The fiber reinforcement can be formed by embedding fibers, preferably short fibers, in the thermoplastic plastics material of the base body. Glass fibers, for example, can be used for the fiber reinforcement. The fiber reinforcement can further improve the strength and stability of the base body and thus of the plate element part and the entire plate element.

In order to be able to further reduce the weight of the plate element, and at the same time to obtain a high level of strength and rigidity, it can be provided that the first base body and/or the second base body have a rib structure. The rib structure preferably has both transverse and longitudinal ribs. The rib structure preferably extends over an entire longitudinal side surface and thus over the entire length and width of the first and/or the second base body. The rib structure is preferably formed on the longitudinal side surface of the relevant base body, which is arranged opposite the longitudinal side surface of the relevant base body on which the organosheet is arranged, such that the organosheet is arranged on a first longitudinal side surface, and the rib structure is arranged on a second longitudinal side surface opposite the first longitudinal side surface of the relevant base body. The rib structure is preferably integrally formed with the relevant base body such that the rib structure can be formed at the same time as the base body is formed.

Particularly preferably, the first base body and the second base body each have a rib structure, wherein ribs of the rib structure of the first base body can be connected to ribs of the rib structure of the second base body to form the connection of the first plate element part to the second plate element part. If the two base bodies have a rib structure, the two plate element parts are thus preferably connected via the rib structures. In this case, a rib of the rib structure of the first base body is preferably connected to a rib of the rib structure of the second base body in each case. In the connected state, the ribs of the rib structure of the first base body preferably abut the ribs of the rib structure of the second base body such that the ribs of the rib structure of the first base body preferably lie flat on the ribs of the rib structure of the second base body. The ribs of the relevant rib structure preferably have the same wall thickness.

The first plate element part is preferably materially connected to the second plate element part. The material connection can form a particularly firm and in particular non-detachable connection between the plate element parts. The material connection can be formed, for example, by means of a welded connection. The welded connection can be formed, for example, by means of an infrared welding process. If the first base body and the second base body each have a rib structure, it is preferably provided that the ribs of the rib structure of the first base body are welded to the ribs of the rib structure of the second base body.

Furthermore, it can preferably be provided that the first base body is materially connected to the first organosheet and/or that the second base body is materially connected to the second organosheet such that a firm, in particular non-detachable connection is also formed between the organosheet and the base body.

In this case, it can be provided that the first base body is injection-molded onto the first organosheet and/or that the second base body is injection-molded onto the second organosheet. By injection-molding the base body onto the organosheet, a positionally accurate, non-changeable positioning of the organosheet on the base body can be achieved.

Functional elements or functional regions can preferably be integrated into the plate element.

At least one tensioning strap guide, in which a tensioning strap of a battery module can be guided, can, for example, be integrated into the plate element.

It can preferably be provided that at least one tensioning strap guide in the form of a groove-shaped recess is formed on the first organosheet or on the second organosheet. The tensioning strap guide is preferably formed on the organosheet that, when the plate element is installed in the battery module, is arranged on an outwardly facing side of the battery module. The tensioning strap can be positioned in the groove-shaped recess of the tensioning strap guide such that the tensioning strap can be reliably prevented from slipping. Preferably, two or more tensioning strap guides are formed on the first or on the second organosheet, wherein the tensioning strap guides are preferably each designed to run parallel to one another.

In order to be able to achieve a particularly good rigidity of the organosheet and thus of the plate element, preferably at least 70%, preferably at least 80%, particularly preferably at least 90%, of the fibers contained in the first organosheet and/or in the second organosheet are aligned in a main stress direction of the plate element. The main stress direction is preferably the main load direction of the plate element. If the organosheet comprises a tensioning strap guide, at least 70% of the fibers are preferably aligned in the same direction as the groove-shaped recess of the tensioning strap guide. A particularly good stability of the plate element can thus also be achieved, in particular, in the region of the tensioning strap guide due to the increased forces acting there on the plate element. In addition, such an orientation of the fibers of the organosheet in the main stress direction allows for a thinner wall thickness in the cover layers of the organosheet, thereby reducing the cost of material for the organosheet and thereby also reducing the weight of the organosheet.

In order to be able to further increase the stability of the plate element, in particular in the region of a tensioning strap guide, the number of ribs of the rib structure of the first base body and/or the number of ribs of the rib structure of the second base body can be increased in the region of the tensioning strap guide. In the region of the tensioning strap guide, the density of the ribs of a rib structure can thus be higher than in the remaining region of the relevant base body.

Functional elements can be integrated directly into the plate element. In an injection-molding process of the first base body and/or the second base body, functional elements can, for example, also be injected directly into the relevant base body.

The plate element can, for example, comprise a fixing element integrated into the first plate element part and/or into the second plate element part for fixing the plate element or the battery module in a battery housing, for example. The fixing element can then preferably be integrated into the first base body and/or into the second base body. The fixing element can, for example, form a fixed bearing or a support.

The object according to the invention is also achieved by means of a battery module for arrangement in a battery housing. According to the invention, the battery module comprises a plurality of battery cells and two plate elements arranged opposite one another, wherein the plurality of battery cells is accommodated between the two plate elements arranged opposite one another, wherein the plate elements are designed and developed as described above.

It is preferably provided that at least one tensioning strap is provided which spans the plurality of battery cells arranged between the plate elements, wherein the tensioning strap can be guided in the tensioning strap guide of the plate elements.

The invention is explained in greater detail in the following with reference to the accompanying drawings using preferred embodiments.

Figure 2:
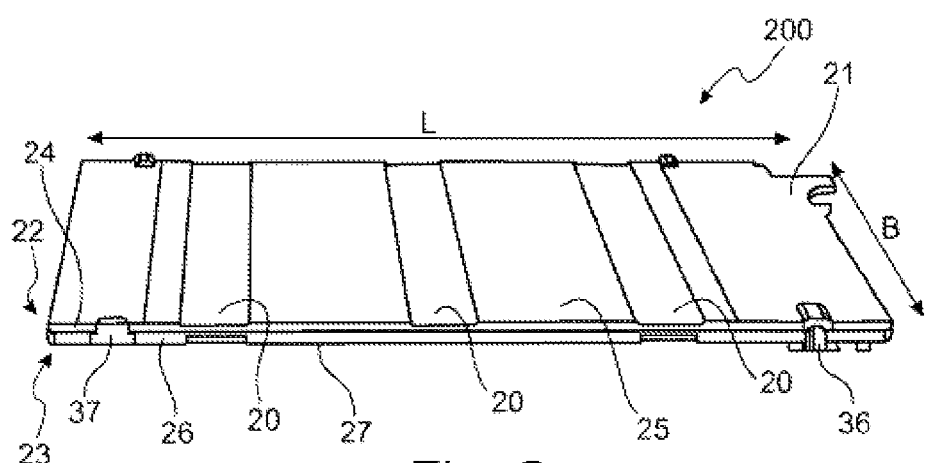
Figure 3:
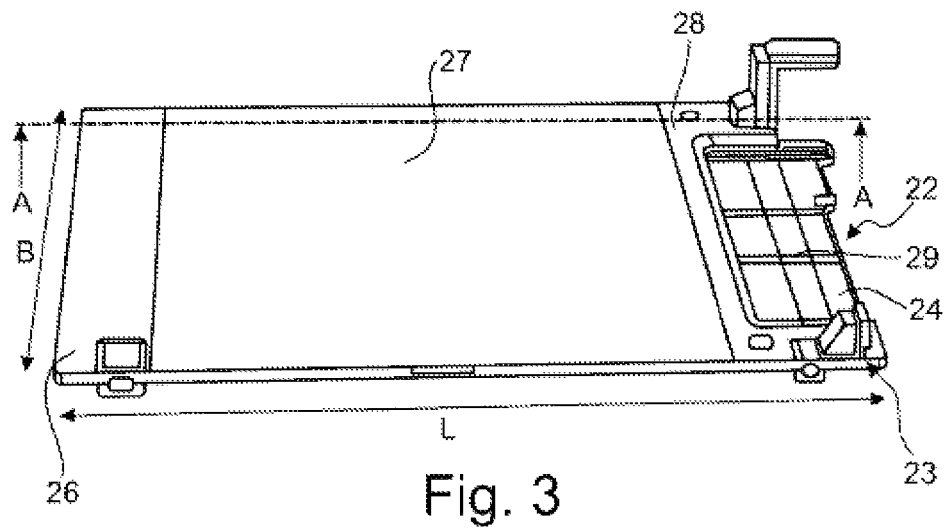
Figure 4:
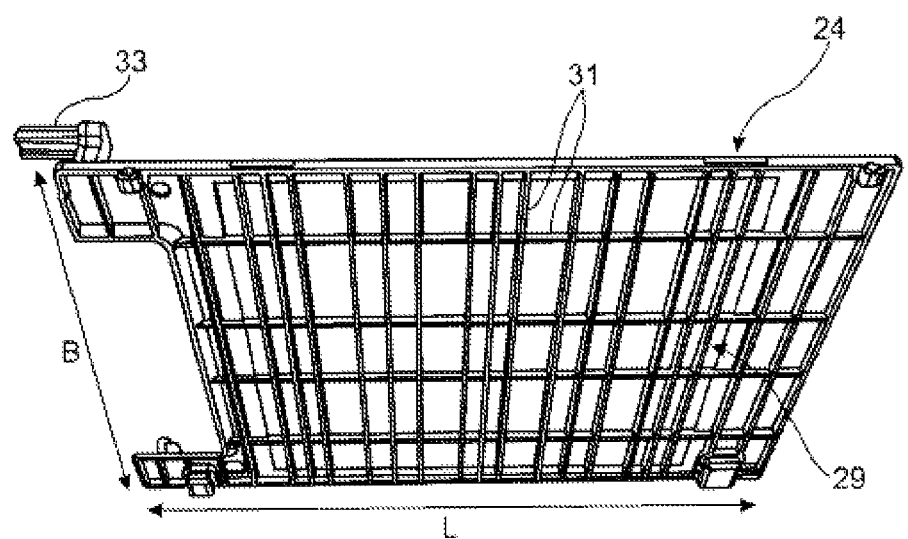
Figure 5:
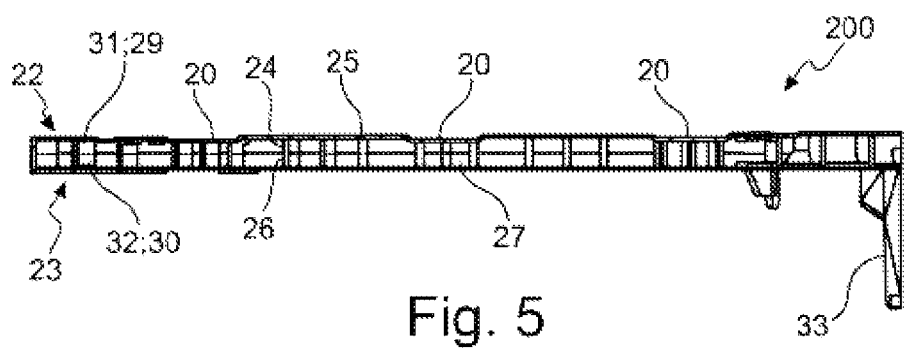
Figure 6:
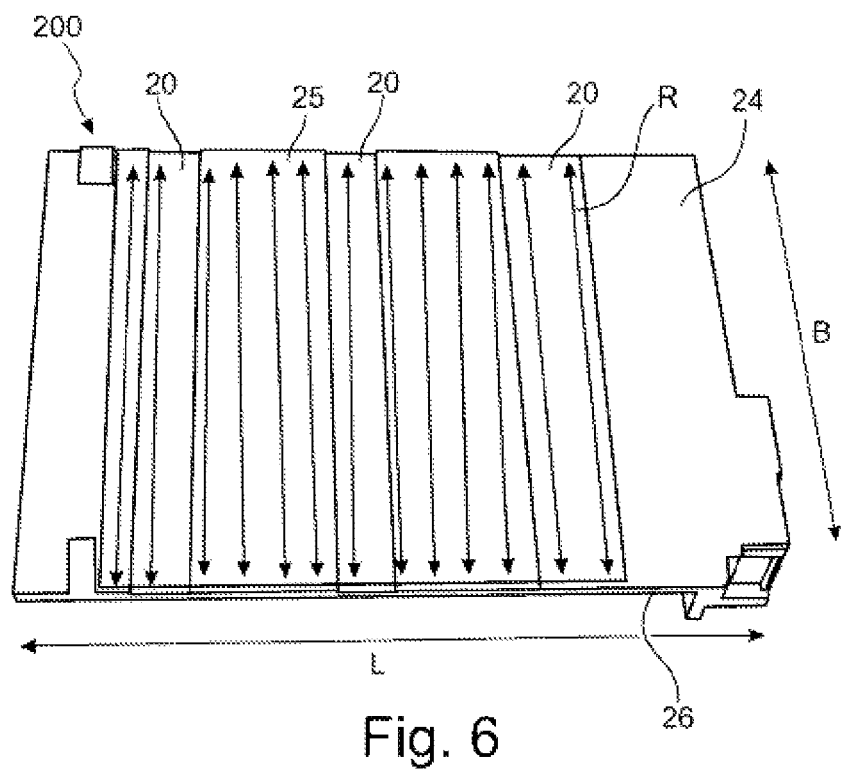
Figure 7:
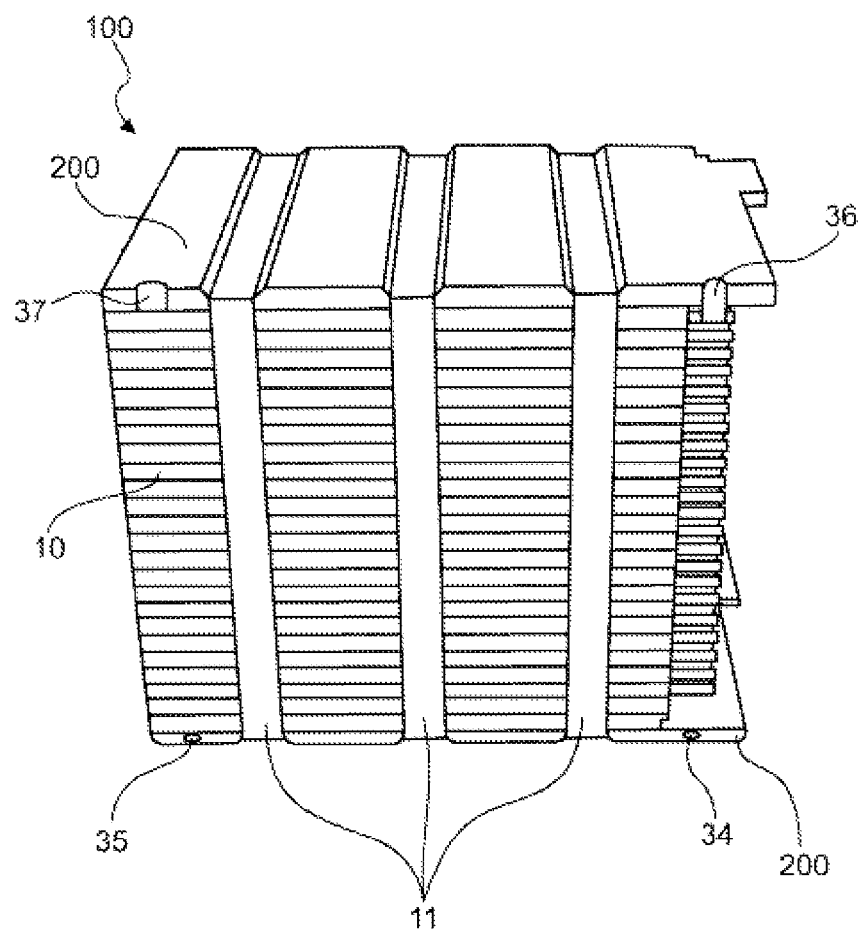

In the drawings:

FIG. 1 is a schematic representation of a battery module unit according to the invention, FIG. 2 is a schematic representation of a plate element according to the invention in a plan view of a first side surface of the plate element, FIG. 3 is a schematic representation of the plate element shown in FIG. 2 in a plan view of a second side surface of the plate element, FIG. 4 is a schematic representation of a base body of a plate element part of the plate element shown in FIGS. 2 and 3, FIG. 5 is a schematic sectional representation of a plate element along the line A-A shown in FIG. 3, FIG. 6 is a schematic representation of a plate element with the direction of extension of the fibers of the organosheet indicated by arrows, and FIG. 7 is a schematic representation of the battery module shown in FIG. 1 with fixing elements provided on the plate elements.

FIG. 1 schematically shows a battery module 100 which can be arranged in a battery housing of a battery, which is not shown here, in particular a battery for driving a motor vehicle such as a hybrid vehicle or a fully electric vehicle.

The battery module 100 comprises a plurality of battery cells 10, which are arranged one behind the other in the embodiment shown here.

Furthermore, the battery module 100 comprises two plate elements 200 between which the battery cells 10 are arranged. The two plate elements 200 are arranged opposite one another such that they accommodate the battery cells 10 between them. The plate elements 200 form so-called end plates of the battery module 100.

In order to be able to hold the battery cells 10 securely between the plate elements 200, the battery module 100 also comprises a plurality of tensioning straps 11. In the embodiment shown here, three tensioning straps 11 are provided, which are arranged to run parallel to one another. The tensioning straps 11 span the two plate elements 200 and the battery cells 10 arranged between the two plate elements 200. For each tensioning strap 11, a tensioning strap guide 20 is formed on the plate elements 200 in the form of a groove-shaped recess, within which the tensioning straps 11 are guided.

FIG. 2 shows a plate element 200 as shown in FIG. 1, in a plan view of a first side surface 21 of the plate element 200. This first side surface 21, which is a longitudinal side surface of the plate element 200, forms, in an assembled state of the battery module as shown in FIG. 1, an outer side of the battery module 100.

The plate element 200 comprises a first plate element part 22 and a second plate element part 23, which are connected to one another, in particular materially.

The first plate element part 22 comprises a first base body 24 and a first organosheet 25, which is arranged on the first base body 24.

The second plate element part 23 comprises a second base body 26 and a second organosheet 27, which is arranged on the second base body 26, as can also be seen in particular in FIG. 3. FIG. 3 shows a plan view of a second side surface 28 of the plate element 200, which is opposite the first side surface 21. In the assembled state of the battery module 100, as can be seen in FIG. 1, the second side surface 28 is arranged facing in the direction of the battery cells 10.

As can be seen in FIGS. 2 and 3, the two plate element parts 22, 23 are connected to one another in such a way that the first organosheet 25 forms a portion of a first outer surface of the plate element 200, which is the same as the first side surface 21 of the plate element 200, and that the second organosheet 27 forms a portion of a second outer surface of the plate element 200, which is the same as the second side surface 28 of the plate element 200. The two organosheets 25, 27 are thus arranged on the outside of the plate element 200.

The organosheets 25, 27 shown in FIGS. 2 and 3 each extend over a portion of the relevant outer surface or side surface 21, 28 of the plate element 200 such that they also only extend over a portion of the relevant base body 24, 26. As can be seen in FIGS. 2 and 3, the organosheets 25, 27 each extend over the entire width B of the relevant base body 24, 26, but not over the entire length L and thus only over a partial length of the relevant base body 24, 26. The size of the organosheets 25, 27 is preferably selected such that the organosheets 25, 27 cover the region of the plate element 200 where the battery cells 10 are accommodated by the plate element 200 such that the plate element has particularly good stability in the region of the battery cells 10, 20 due to the organosheets 25, 27.

The organosheets 25, 27 each comprise a fiber fabric or a fiber scrim, which is embedded in a thermoplastic plastic matrix. The fiber fabric or fiber scrim is formed from carbon fibers, for example. The thermoplastic plastic matrix is, for example, made of polyamide, in particular polyamide 6.

The base bodies 24, 26 can each be designed as an injection-molded part made of a thermoplastic plastics material. The thermoplastic plastics material can, like the plastic matrix of the organosheets 24, 26, be made from polyamide, in particular from polyamide 6. In order to increase the stability of the base bodies 24, 26, they can comprise a fiber reinforcement, for example by introducing glass fibers into the thermoplastic plastics material of the base bodies 24, 26.

During the production of the plate element 200, the two plate element parts 22, 23 are first produced and formed before they are connected to one another in order to form the finished plate element 200.

For the production and formation of the plate element parts 22, 23, the organosheets 25, 27 are shaped and formed first. The organosheet 25, 27 is then placed in an injection-molding tool and the organosheet 25, 27 is overmolded on one side with a thermoplastic plastics material which forms the base body 24, 26. The base body 24, 26 is thus injection-molded onto the organosheet 25, 27 in order to form the relevant plate element part 22, 23. When the two plate element parts 22, 23 are finished, they are connected to one another via the two base bodies 24. In the connected state of the two plate element parts 22, 23, the two base bodies 24, 26 are connected to one another.

The connection of the two plate element parts 22, 23 and thus of the two base bodies 24, 26 to one another is preferably carried out by forming a material connection, for example by welding the two plate element parts 22, 23 to one another. However, it is also possible to bond the two plate element parts 22, 23 to one another in order to form a material connection between the two plate element parts 22, 23.

As can be seen in FIGS. 4 and 5, the two base bodies 24, 26 have a rib structure 29, 30 which is formed from a plurality of ribs 31, 32, wherein the ribs 31, 32 are designed as transverse ribs and as longitudinal ribs. The rib structure 29, 30 extends over the entire length L and the entire width B of the relevant base body 24, 26 in each case.

The two plate element parts 22, 23 are connected via the rib structure 29, 30 of the base bodies 24, 26 by, as can be seen in FIG. 5, connecting the ribs 31 of the rib structure 29 of the first base body 24 with the ribs 32 of the rib structure 30 of the second base body 26. In the connected state, the ribs 31 of the rib structure 29 of the first base body 24 abut the ribs 32 of the rib structure 30 of the second base body 26 such that the ribs 31 of the rib structure 29 of the first base body 24 lie flat on the ribs 32 of the rib structure 30 of the second base body 26, as can be seen in FIG. 5.

As can be seen, for example, in FIGS. 2, 5 and 6, the tensioning strap guide 20 is formed in the first organosheet 25 of the first plate element part 22, since this first organosheet 25 faces outward in the installed state. The groove-shaped recess of the tensioning strap guide 20 is thus formed in the first organosheet 25.

In the embodiment shown here, three tensioning strap guides 20 are formed. As can be seen in FIG. 5, the number of ribs 31 of the rib structure 29 of the first base body 24 and the number of ribs 32 of the rib structure 30 of the second base body 26 is increased in the region of the tensioning strap guides 20 such that the ribs 31, 32 are arranged closer together in the region of the tensioning strap guides 20.

The fibers of the fiber fabric or fiber scrim of the organosheets 25, 27 are substantially aligned in the main stress direction R of the plate element 200 such that more than 80% of the fibers of the organosheets 25, 27 extend in the main stress direction R, as indicated by the arrows in FIG. 6, wherein the main stress direction R extends along the width B of the plate element parts 22, 23 and thus along the width of the plate element 200. The main stress direction R thus extends in the same direction as the longitudinal extension of the groove-shaped recesses of the tensioning strap guides 20.

By forming the base bodies 24, 26 of the plate element parts 22, 23 from a thermoplastic plastics material, functional elements, such as connecting elements 33 for module units, which are not shown here, can be directly integrated into the base body 24, 26 and thus into the plate element parts 22, 23 and the plate element 200 during production. The functional elements can, for example, be integrally formed with the base body 24, 26, as is done with the connecting element 33, or they can be inserted into the injection-molding tool as an insert part and, when the base body 24, 26 is injection-molded, overmolded by the material of the base body 24, 26.

As shown in FIG. 7, fixing elements 34, 35, 36, which can be used to fix the plate element 200 and thus the entire battery module 100 during an assembly process, can also be integrated into the plate element part 22, 23, in particular into the base body 24, 26 of a plate element part 22, 23, as functional elements. Furthermore, a support 37 can also be integrated into the plate element part 22 and/or 23 as a functional element, as shown in FIG. 7.

The fixing element 34 forms a fixed bearing and the fixing element 35 forms a support such that the two fixing elements 35, 36 can prevent a rotational movement of the battery module 100 in the battery housing.

LIST OF REFERENCE SIGNS

100 Battery module
200 Plate element
10 Battery cell
11 Tensioning strap
20 Tensioning strap guide
21 First side surface
22 First plate element part
23 Second plate element part
24 First base body
25 First organosheet
26 Second base body
27 Second organosheet
28 Second side surface
29 Rib structure
30 Rib structure
31 Rib
32 Rib
33 Connecting element
34 Fixing element
35 Fixing element
36 Fixing element
37 Support
L Length
B Width
R Main stress direction

The invention claimed is:

1. A battery module for arrangement in a battery housing, comprising:
    a plurality of battery cells;
    a first plate element part; and
    a second plate element part arranged opposite the first plate element part,
    wherein the first plate element part is connected to the second plate element part,
    wherein the first plate element part comprises a first base body and a first organosheet arranged on the first base body,
    wherein the second plate element part comprises a second base body and a second organosheet arranged on the second base body,
    wherein the plurality of battery cells is accommodated between first plate element and the second plate element, and
    wherein a first fixing element that is a fixed bearing is integrated into the first plate element part, and a second fixing element that is a support is formed in the second plate element part for fixing the first and second plate elements to prevent rotational movement.

2. The plate element according to claim 1, wherein the first plate element part and the second plate element part are connected to one another such that the first organosheet forms at least a portion of a first outer surface of the plate element and the second organosheet forms at least a portion of a second outer surface of the plate element that is opposite the first outer surface.

3. The plate element according to claim 1, wherein the first base body and/or the second base body is made of a thermoplastic plastics material.

4. The plate element according to claim 3, wherein the thermoplastic plastics material of the first base body, and/or the thermoplastic plastics material of the second base body comprises a fiber reinforcement.

5. The plate element according to claim 1, wherein the first base body and/or the second base body has a rib structure.

6. The plate element according to claim 1, wherein the first base body and the second base body each have a rib structure, and
    wherein, to form a connection of the first plate element part to the second plate element part, ribs of the rib structure of the first base body are connected to ribs of the rib structure of the second base body.

7. The plate element according to claim 1, wherein the first plate element part is materially connected to the second plate element part.

8. The plate element according to claim 1, wherein the first base body is injection-molded onto the first organosheet and/or in that the second base body is injection-molded onto the second organosheet.

9. The plate element according to claim 6, wherein at least one tensioning strap guide in the form of a groove-shaped recess is formed on the first organosheet or on the second organosheet.

10. The plate element according to claim 1, wherein at least 70% of fibers contained in the first organosheet and/or in the second organosheet are aligned in a main stress direction (R) of the plate element.

11. The plate element according to claim 9, wherein, in a region of the at least one tensioning strap guide, the ribs of the rib structure of the first base body and/or the ribs of the rib structure of the second base body are spaced closer together than in a region outside of the region of the at least one tensioning strap guide.

12. The battery module according to claim 1, wherein at least one tensioning strap is provided which spans the two plate elements and the battery cells arranged between the two plate elements, wherein the tensioning strap is guided in the tensioning strap guide of the plate elements.

\* \* \* \* \*